(12) United States Patent
Watté et al.

(10) Patent No.: US 12,111,498 B2
(45) Date of Patent: Oct. 8, 2024

(54) DEVICES AND OPTICAL FIBER ROUTING ARRANGEMENTS FOR WAVE DIVISION MULTIPLEXING EQUIPMENT

(71) Applicant: COMMSCOPE TECHNOLOGIES LLC, Hickory, NC (US)

(72) Inventors: Jan Watté, Vlaams-Brabant (BE); Thierry Mike Declerck, Vlaams-Brabant (BE); David James Mather, Altrincham (GB)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/773,250

(22) PCT Filed: Oct. 29, 2020

(86) PCT No.: PCT/US2020/057979
§ 371 (c)(1),
(2) Date: Apr. 29, 2022

(87) PCT Pub. No.: WO2021/087123
PCT Pub. Date: May 6, 2021

(65) Prior Publication Data
US 2022/0365283 A1 Nov. 17, 2022

Related U.S. Application Data

(60) Provisional application No. 62/928,477, filed on Oct. 31, 2019.

(51) Int. Cl.
*G02B 6/293* (2006.01)

(52) U.S. Cl.
CPC ....... *G02B 6/29362* (2013.01); *G02B 6/2938* (2013.01)

(58) Field of Classification Search
CPC ................................................. G02B 6/29362
See application file for complete search history.

(56) References Cited

U.S. PATENT DOCUMENTS 5,204,925 A    4/1993   Bonanni et al.
5,479,547 A * 12/1995   Kunikane .......... G02B 6/12007
                                        385/47

(Continued)

FOREIGN PATENT DOCUMENTS

KR   10-2011-0044048 A   4/2011
KR      10-1227651 B    1/2013

(Continued)

OTHER PUBLICATIONS

International Search Report and Written Opinion of the International Searching Authority for International Patent Application No. PCT/US2020/057979 mailed Feb. 18, 2021, 7 pages.

(Continued)

*Primary Examiner* — Chris H Chu
(74) *Attorney, Agent, or Firm* — Merchant & Gould P.C.

(57) ABSTRACT

Components and arrangements for managing wave division multiplexing (WDM) filters of fiber optic networks. A flexible a substrate is used to fix a fiber routing scheme that corresponds to a cascading arrangement of WDM filters. The WDM filters can be packaged as a standalone unit for easier handling and splicing of fiber pigtails to the pre-arranged fiber routing scheme.

10 Claims, 6 Drawing Sheets

(56) References Cited

U.S. PATENT DOCUMENTS

| | | | |
|---|---|---|---|
| 6,097,867 A * | 8/2000 | Brueck | G02F 1/3558 |
| | | | 385/129 |
| 6,167,171 A | 12/2000 | Grasis et al. | |
| 6,168,319 B1 * | 1/2001 | Francis | G02B 6/32 |
| | | | 385/60 |
| 6,445,866 B1 | 9/2002 | Clairadin et al. | |
| 6,554,483 B1 | 4/2003 | Sun et al. | |
| 6,594,436 B2 | 7/2003 | Sun et al. | |
| 6,600,860 B2 | 7/2003 | Sun et al. | |
| 6,873,773 B2 | 3/2005 | Sun et al. | |
| 7,218,806 B2 * | 5/2007 | Han | G02B 6/4246 |
| | | | 385/47 |
| 2003/0002787 A1 | 1/2003 | Honda et al. | |
| 2003/0198427 A1 * | 10/2003 | Bragg | G02B 6/3608 |
| | | | 385/14 |
| 2004/0067014 A1 | 4/2004 | Hollars et al. | |
| 2004/0109640 A1 * | 6/2004 | Tai | G02B 6/2937 |
| | | | 385/24 |
| 2009/0303460 A1 * | 12/2009 | Habel | D04B 21/16 |
| | | | 356/32 |
| 2010/0178021 A1 * | 7/2010 | Vastmans | G02B 6/4471 |
| | | | 385/135 |
| 2013/0302032 A1 * | 11/2013 | Shimakawa | H04J 14/02 |
| | | | 398/48 |

FOREIGN PATENT DOCUMENTS

| | | |
|---|---|---|
| KR | 10-2016-0145956 A | 12/2016 |
| WO | 2014/055859 A1 | 4/2014 |
| WO | 2016/020262 A1 | 2/2016 |
| WO | 2018/085767 A1 | 5/2018 |
| WO | 2018/193005 A1 | 10/2018 |
| WO | 2019/195602 A1 | 10/2019 |

OTHER PUBLICATIONS

Extended EP Search Report for EP Application No. 20881338.6, dated Nov. 2, 2023 (10 pages).

* cited by examiner

DEVICES AND OPTICAL FIBER ROUTING ARRANGEMENTS FOR WAVE DIVISION MULTIPLEXING EQUIPMENT

CROSS-REFERENCE TO RELATED APPLICATION

This application is a National Stage Application of PCT/US2020/057979, filed on Oct. 29, 2020, which claims the benefit of U.S. Patent Application Ser. No. 62/928,477, filed on Oct. 31, 2019, the disclosures of which are incorporated herein by reference in their entireties. To the extent appropriate, a claim of priority is made to each of the above disclosed applications.

TECHNICAL FIELD

The present disclosure relates generally to telecommunications management devices. More specifically, the present disclosure relates to fiber management devices and systems for managing optical fibers.

BACKGROUND

Fiber optic networks employ optical fibers to transmit optical signals between provider and subscriber locations. A variety of hardware is used to provide the needed connectivity and fiber routing. In a fiber routing scheme that employs wave division multiplexing, a multiplexer (MUX) is provided at a transmission side and a demultiplexer (DEMUX) is provided at a receiver side. Signals of different wavelengths are fed to the MUX, which groups the signals onto a single conduit, e.g., an optical fiber. The grouped signals then travel to the DEMUX, which splits the signals by wavelength into separate conduits (e.g., separate optical fibers) that are routed towards subscriber locations.

As telecommunications networks grow and available bandwidth increases, the amount of hardware tends to increase as well, and managing telecommunications equipment, such as multiplexers and demultiplexers, in an organized manner that minimizes risk of equipment damage and signal degradation becomes increasingly challenging.

SUMMARY

In general terms, the present disclosure is directed to management and organization of wave division multiplexing equipment of fiber optic networks.

Certain aspects of the present disclosure relate to fiber routing arrangements that include a flexible substrate that fixes routing paths of optical fibers that are spliced to or adapted to be spliced to a cascading arrangement of wave division multiplexing (WDM) filters.

Certain aspects of the present disclosure relate to packaging arrangements for packaging a plurality of WDM filters as a WDM filter unit.

Certain aspect of the present disclosure relate to WDM arrangements that include fiber routing arrangements that include a flexible substrate that fixes routing paths of optical fibers that are spliced to a WDM filter unit.

Certain wave division multiplexers and demultiplexers use optical filters, e.g., thin-film filters. In an example arrangement, an input optical fiber (or "fiber") carries multiple wavelengths of optical signals and is connected to a first filter. The first filter transmits one of the wavelengths as a first transmitted or pass-through wavelength and reflects the other wavelengths. The reflected wavelengths travel via a first intermediate fiber to a second filter, which transmits one of the remaining wavelengths as a second pass-through wavelength and reflects the remaining wavelengths through a second intermediate fiber. The pattern repeats itself until the last filter in the cascade of filters (filter n, where n is a positive integer greater than or equal to 1 transmits the nth pass-through wavelength and reflects one or more other wavelengths as a signal output from the demultiplexer). The split signals are routed as needed toward subscriber locations.

Optical filters can be bulky, particularly when grouped together to form a cascade arrangement, and splices are needed to splice intermediate fibers together, which require splice protectors, creating additional bulk. The fiber routing can be complex due to the large number and signal splitting sequencing needs of filter cascades, while the equipment that houses these components, such as a tray or cassette positioned in a fiber optic closure or other fiber manager has limited space for storage and for performing fiber routing and splicing. Aspects of the present disclosure can facilitate splicing of fiber arrangements for WDM filter cascades, and/or help to limit the amount of physical space occupied by the filter cascades and their corresponding fiber routing arrangements.

Certain aspects of the present disclosure relate to a flexible, film-like substrate that has optical fiber management, storing functionality, and optionally splicing functionality all on one film-like substrate. Various types of splicing can be used to splice single fibers or multi-fibers, for example, mechanical splices, fusion splices, etc.

The flexible, film-like substrate provides a routing path for routing optical fibers onto a flexible planar substrate that can be temporarily supported by, mounted on or attached to the flexible planar substrate. The flexible, film-like substrate can accommodate fibers that are in a multi-fiber (e.g., ribbon) configuration or a single fiber configuration.

Examples of flexible, film-like substrates and their uses are described in International PCT Application No. PCT/US2019/025869, the contents of which are hereby incorporated by reference in their entirety.

According to certain aspects of the present disclosure, a fiber routing arrangement comprises a flexible substrate; a plurality of filter optical connection locations provided along an edge of the flexible substrate, the optical filter connection locations including a first filter connection location, a second filter connection location, a third filter connection locations, a fourth filter connection location and a fifth filter connection location; a first fiber optic path routed on the flexible substrate from an optical input location to the first filter connection location; a second fiber optic path routed on the flexible substrate from the first filter connection location to the second filter connection location; a third fiber optic path routed on the flexible substrate from the second filter connection location to the third filter connection location; a fourth fiber optic path routed on the flexible substrate from the third filter connection location to the fourth filter connection location; a fifth fiber optic path routed on the flexible substrate from the fourth filter connection location to the fifth filter connection location; and a sixth fiber optic path routed on the flexible substrate from the fifth connection location to an output location.

According to further aspects of the present disclosure, fiber routing arrangement comprises: a flexible substrate; a plurality of filter optical connection locations provided along an edge of the flexible substrate, the filter connection locations each including a set of first and second optical fibers, each set of first and second optical fibers being coupled to a separate WDM filter; and fiber routing paths on the flexible substrate that optically connect the WDM filters in series with each other.

According to further aspects of the present disclosure, fiber optic device comprises: a packaging arrangement; and a plurality of WDM filters packaged within the packaging arrangement, each of the WDM filters including an input signal optical fiber that projects from the packaging arrangement, a reflected signal optical fiber that projects from the packaging arrangement, and a pass-through signal optical fiber that projects from the packaging arrangement.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The present disclosure is directed generally to fiber management devices, including fiber devices that employ a flexible, film-like substrate. In certain examples, the flexible, film-like substrate of the present disclosure provides fixed fiber routing functionality, loose fiber routing functionality, loose fiber storage, storage functionality, and optionally splice mounting capability configured all on one single flexible, film-like substrate.

The flexible, film-like substrate includes multiple optical fibers attached to and supported by a flexible planar substrate, such as polyethylene terephthalate (PET) foil or other flexible polymer substrate. However, it should be understood that PET is simply one non-limiting example polymer that may be used to form the flexible foil of the present disclosure, and other polymers having similar characteristics and that are able to at least semi-rigidly support the fibers in a predetermined orientation are also usable in accordance with the inventive concepts of the present disclosure.

Although specific examples herein depict and describe planar substrates, it should be appreciated that other substrate configurations, e.g., in which a substrate routes fibers in and/or across multiple planes are also contemplated. The fibers can extend past the ends of the flexible, film-like substrate so that they can be spliced to fibers that are connected to WDM filters. In certain examples, the optical fibers can include first portions fixedly managed by or routed on (e.g., via adhesive bonding) the substrate and second portions non-fixedly stored, routed by or otherwise managed by the substrate. In one example, the non-fixed fiber portion can be stored or arranged in a coil or loop of optical fiber that is removable/detachable from the substrate. In another example, substrate includes a foldable flap, and a coil or loop of optical fiber is stored on the flap, e.g., by hooking onto tabs or cutouts of the flap.

The flexible, film-like substrate can be a composite structure that includes at least three layers of which two layers are flexible planar substrates, such as PET foil, and the third layer includes an adhesive material. Example adhesives include epoxy, light curable adhesive (e.g., ultraviolet light curable adhesive), thermo-form adhesive, thermo-set adhesive, index-matching adhesive or other adhesives. In certain examples, the adhesive material can be deposited on top of a first flexible planar substrate and a second flexible planar substrate can be laminated to the first flexible planar substrate such that the adhesive material is sandwiched between the first and second flexible planar substrates.

Supporting the optical fibers on a flexible, film-like substrate essentially comprises one or more fibers being routed on a flexible planar substrate, typically with a needle extending from a robotic arm, and then securing the routed fibers to the flexible planar substrate with an adhesive, which is allowed to set or cure. In some examples, therefore, the uncured adhesive is pre-applied to the substrate before the fiber routing. Furthermore, in some examples, an additional optional layer of material can be applied on top of the fibers and the adhesive to affix the fibers. Any suitable material can be used for this purpose. In a non-limiting example, an elastomer such as silicone can be applied on top of the fibers and the adhesive on the substrate. In some examples, the elastomer is cured after application to the substrate; in other examples, the silicone can be pre-cured.

The method of assembly of the flexible, film-like substrate of the present disclosure provides a number of advantages. For example, no additional features or supports are needed for providing optical fiber management and storage on the flexible, film-like substrate. In addition, the particular fiber routing schemes described in more detail below are well suited for, and can improve management of, WDM filters and filter assemblies.

Aspects of the present disclosure relate to the flexible, film-like substrate optionally having a flexibility that flexes up to but not beyond a minimum bend radius of an optical fiber intended to be managed. In one example, the optical fiber is a G657A or G652D optical fiber. In one example, a plurality of different types of optical fibers are intended to be managed by the flexible, film-like substrate, and the minimum bend radius beyond which the flexible, film-like substrate does not flex corresponds to the minimum bend radius of the optical fiber having the highest minimum bend radius of the optical fibers (i.e., the manger can be designed for the worse-case scenario). Preferably, the flexible, film-like substrate does not break or kink to ensure the safety and protection of the optical fibers. In certain examples, the flexible, film-like substrate is bendable in such a way that the optical fiber bend radius requirements are respected and satisfied.

In other examples, the flexible, film-like substrate may have a flexibility that allows the flexible, film-like substrate to flex along a bend smaller than a minimum bend radius of the optical fiber or fibers being managed.

In certain examples, the flexible, film-like substrate has a construction that prevents the flexible, film-like substrate from being bent along a curvature having a radius smaller than a minimum bend radius of the optical fiber intended to be managed on the flexible, film-like substrate. In certain examples, the flexible, film-like substrate has a construction that allows it to be bent along a curvature having a radius smaller than 10 centimeters (cm), or 8 cm, or 6 cm, or 5 cm, or 4 cm, or 3 cm, or 2 cm, without breaking or kinking, and optionally prevents the flexible, film-like substrate from being bent along a curvature having a radius smaller than a minimum bend radius of the optical fiber intended to be managed on the flexible, film-like substrate.

Figure 1:
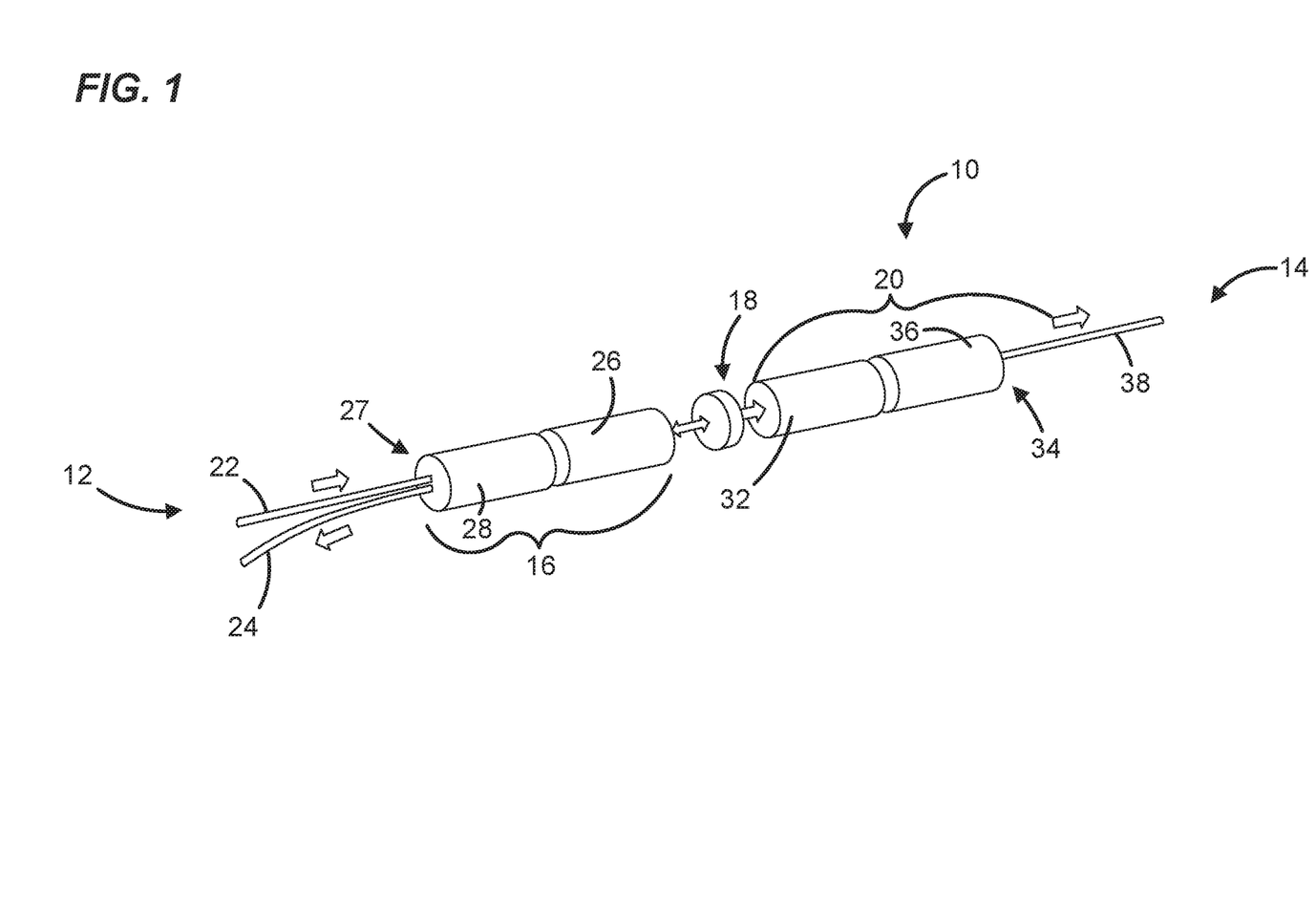
FIG. 1 is a partially exploded, schematic view of a typical WDM filter assembly.

FIG. 1 is a partially exploded, schematic view of a typical WDM filter assembly 10. The assembly 10 has a signal input side 12 and an opposite signal output side 14. A signal input arrangement 16 is positioned at an input side of a thin film filter element 18, and a signal output arrangement 20 is positioned at an output side of the thin film filter element 18.

The signal input arrangement 16 includes an input pigtail 27 consisting of a ferrule 28 that terminates an input signal fiber 22 and a reflected signal fiber 24. The signal input arrangement 16 also includes a first focal lens 26. The ferrule 28 is optically coupled to the first focal lens 26, which expands the input signal. The expanded input signal encounters the thin film filter element 18, which causes a first wavelength of the input signal to transmit or pass through the thin film filter 18 to the signal output arrangement 20, and the non-transmitted wavelengths to reflect. The reflected wavelengths are collimated by the first focal lens 26 and then propagate along the reflected signal fiber 24. In this manner, the first wavelength is split (or divided) from the remaining wavelengths.

The signal output arrangement 20 includes a second focal lens 32 and an output pigtail 34 consisting of a ferrule 36 that terminates an output signal fiber 38 such that the output signal fiber 38 is optically coupled to the second focal lens 32. The first transmitted wavelength is collimated by the second focal lens 32 and then propagates along the output signal fiber 38 toward, e.g., a subscriber location.

Figure 2:
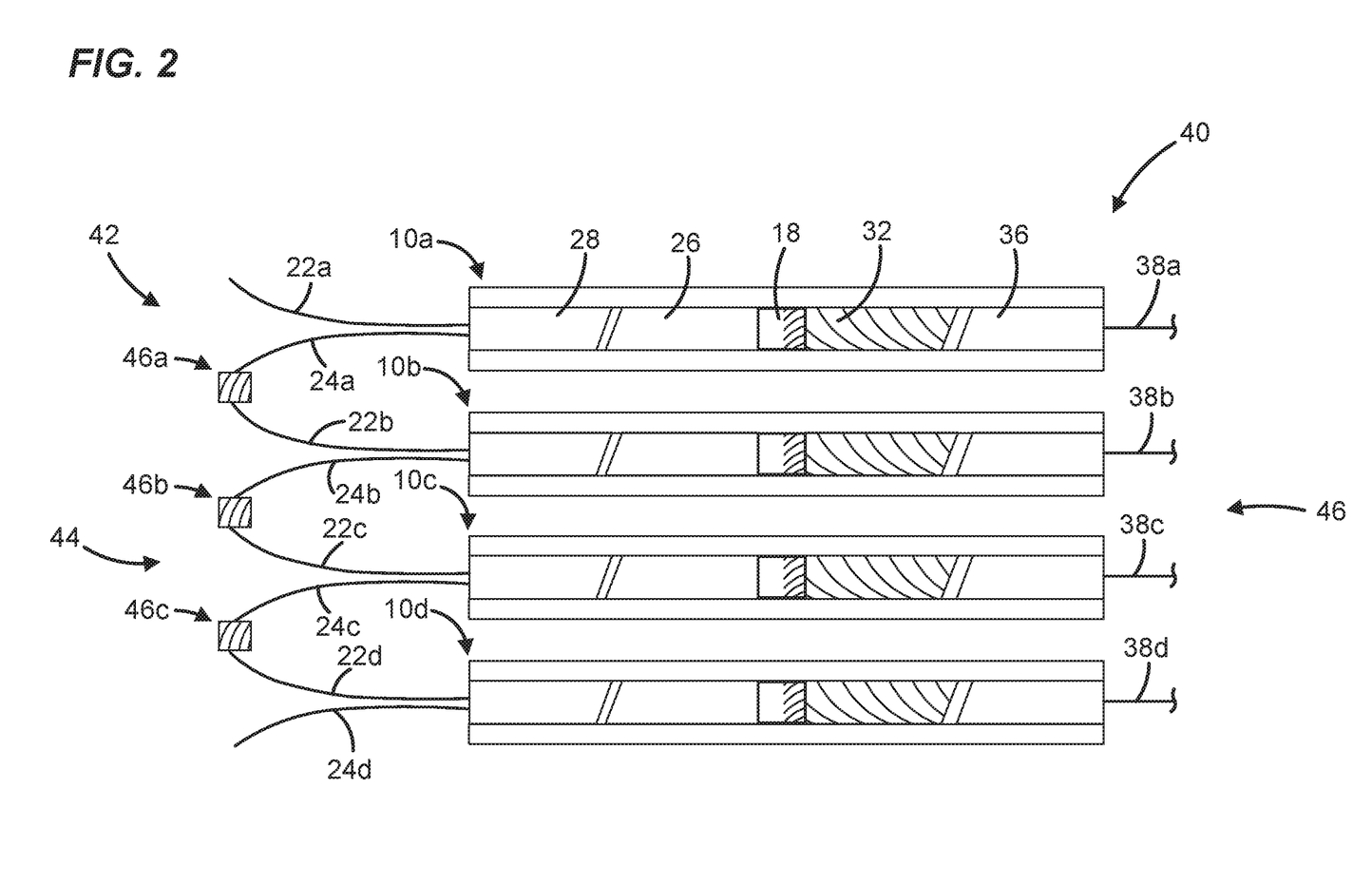
FIG. 2 is a schematic view of a typical cascade arrangement of four of the WDM filter arrangements of FIG. 1 and including a typical fiber routing scheme.

FIG. 2 is a schematic view of a typical cascade arrangement 40 of four of the WDM filter assemblies 10 of FIG. 1 (delineated, respectively, as 10a, 10b, 10c, 10d) and including a typical fiber routing scheme 42. The cascade arrangement 40 generally has a signal input side 44 and an opposite signal output side 46.

In use, an input signal including n wavelengths, n being an integer greater than 4, travels along the input fiber 22a to the filter assembly 10a, which allows a first transmitted wavelength to pass through to the output fiber 38a and reflects the remaining n−1 wavelengths along the reflected signal fiber 24a. The reflected signal fiber 24a is spliced at a splice location 46a to an input fiber 22b of the filter assembly 10b. The filter assembly 10b allows a second transmitted wavelength to pass through to the output fiber 38b and reflects the remaining n−2 wavelengths along the reflected signal fiber 24b. The reflected signal fiber 24b is spliced at a splice location 46b to an input fiber 22c of the filter assembly 10c. The filter assembly 10c allows a third transmitted wavelength to pass through to the output fiber 38c and reflects the remaining n−3 wavelengths along the reflected signal fiber 24c. The reflected signal fiber 24c is spliced at a splice location 46c to an input fiber 22d of the filter assembly 10d. The filter assembly 10d allows a fourth transmitted wavelength to pass through to the output fiber 38d and reflects the remaining n−4 wavelength(s) along the reflected signal fiber 24d, which serves as a general output fiber for the entire arrangement 40. Each of the divided first, second third and fourth wavelengths, as well as the n−4 wavelength(s) travelling along the general output fiber 24d, can travel via their respective output fiber, toward subscriber locations.

Due to minimum bend radius limitations of optical fibers, and since a reflected signal fiber of each filter assembly is spliced to an input signal fiber of an adjacent filter assembly, it can be appreciated that the arrangement 40 can require that the filter assemblies 10a, 10b, 10c, and 10d be spaced relatively far apart from one another to ensure that the minimum bend radius limitations are met. For example, if the filter assemblies 10a and 10b are too close together, the fiber routing path of the reflected signal fiber 24a and input signal fiber 22b may have too small a bend radius, causing degradation in signal transmission and/or increasing the risk of fiber breakage. Loops of excess fiber can be used to mitigate such bend radius issues, but since the routing scheme 42 is not fixed, there is a risk that fibers will shift beyond their minimum bend radii. In addition, the large number of fibers (due to the large number of filter assemblies) can create a complex and bulky mass of fibers that is difficult to manage and takes up large amounts of storage space in, e.g., a fiber optic cassette or tray.

Figure 3:
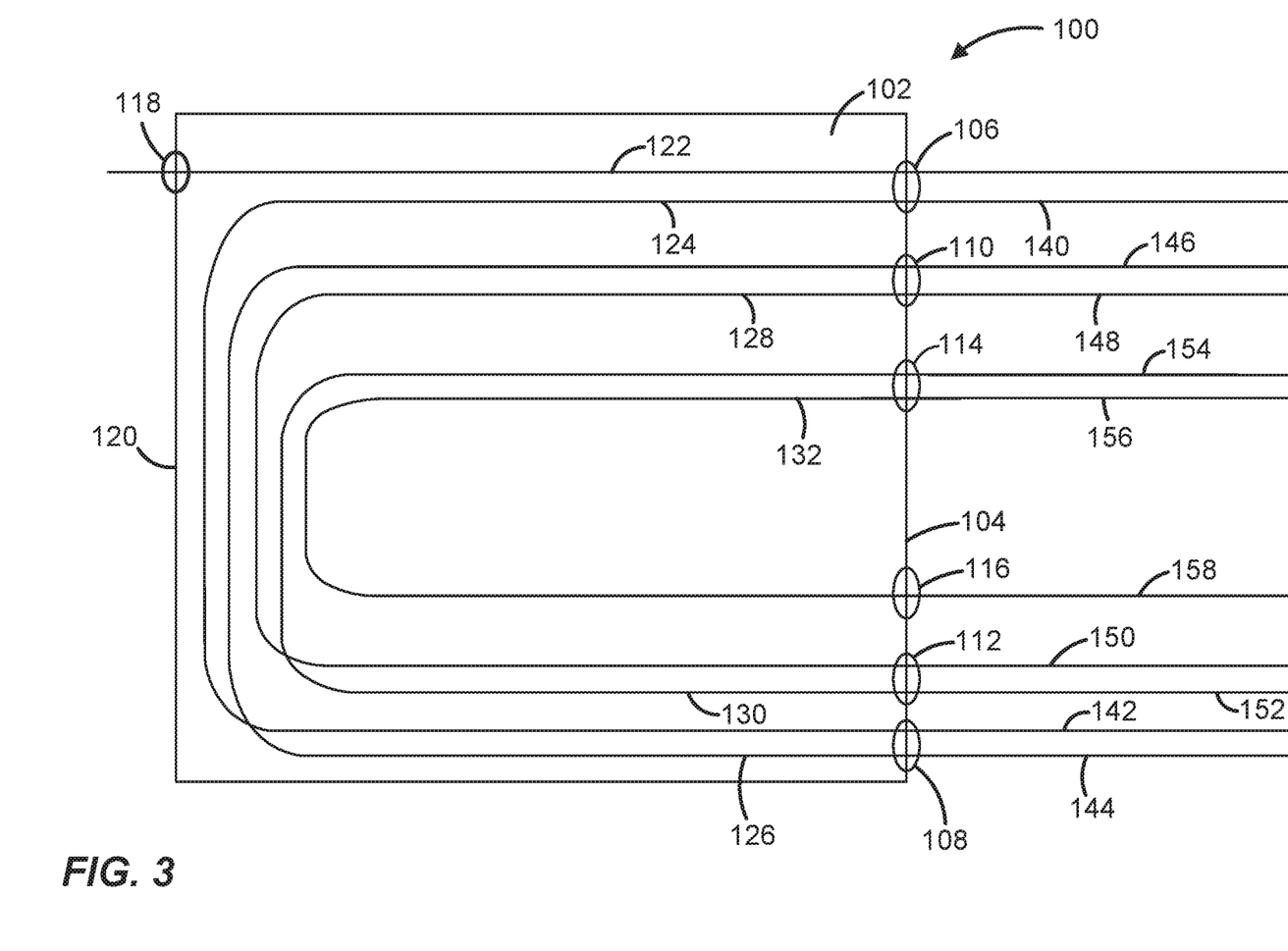
FIG. 3 is a schematic view of an example WDM fixed fiber routing scheme in accordance with the present disclosure, and employing a flexible substrate.
Figure 4:
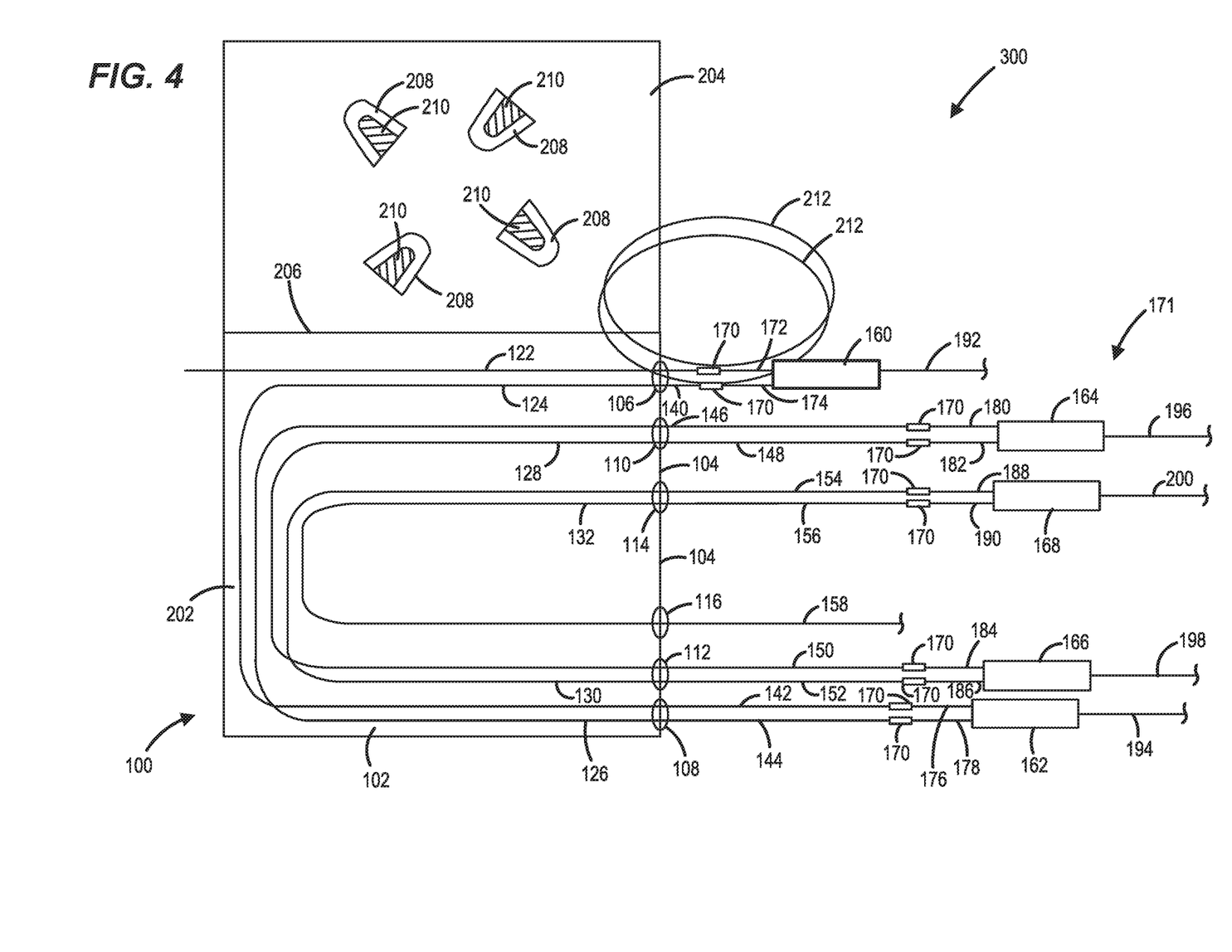
FIG. 4 is a schematic view of the WDM fixed fiber routing scheme of FIG. 3 spliced to an arrangement of WDM filters.

FIG. 3 is a schematic view of an example WDM fixed fiber routing scheme or arrangement 100 in accordance with the present disclosure, and employing a flexible substrate 102. FIG. 4 is a schematic view of the WDM fixed fiber routing scheme 100 spliced to an arrangement 171 of WDM filters 160, 162, 164, 166, 168 forming a WDM arrangement 300.

Referring to FIGS. 3-4, the flexible substrate 102 can be manufactured in any of the manners described herein. In some examples, the substrate 102 is a final product that can be cut from bulk substrate, fiber manager, fiber management substrate, sheet, film, liner, sleeve, envelope, thin tray, carrier, etc., such as PET foil, in accordance with the present disclosure. In some examples, the flexible substrate 102 is a multi-layer substrate that can include: a first planar flexible substrate layer (e.g., base substrate layer, bottom substrate layer, bulk substrate), an adhesive layer (e.g., epoxy), and an optional second planar flexible substrate layer (e.g., top substrate layer), although alternatives are possible. The first planar flexible substrate layer has a top surface onto which the adhesive layer can be deposited for holding portions of routed optical fibers 122, 124, 126, 128, 130, 132 (e.g., pre-fibered layer) on the first planar flexible substrate layer. The second planar flexible substrate layer can be affixed to the first planar flexible substrate layer via the adhesive layer such that the routed optical fiber can be secured between the first and second planar flexible substrate layers. As such, the adhesive can control the routing path of optical fibers. The first and second planar flexible substrate layers together form a sealed attachment to seal and provide protection for the optical fibers.

The process of routing the optical fibers can be an automated process, although alternatives are possible. In certain examples, the optical fibers can be routed onto the first planar flexible substrate layer with a needle extending from a robotic arm. That is, to route the fibers on the first planar flexible substrate layer, in some examples the fiber can be laid on the first planar flexible substrate layer by being passed through a needle controlled by robotics, the robotics being configured to route the fiber along a pre-defined path on the first planar flexible substrate layer. The robotics can be configured to route the fiber in a single plane or across multiple planes; similarly, separate fibers can be routed in the same or different plane(s) of the substrate as other fibers. As it routes the optical fibers, the needle can be configured to press the optical fibers onto the adhesive layer that has been pre-applied to the first planar flexible substrate layer. In some examples, the fiber is dispensed from a spool and a cutting device disposed at or near the needle end is configured to cut a length of fiber after it has been laid on the first planar flexible substrate layer so that the next length of fiber can be laid.

As mentioned, in some examples, the routed optical fibers are secured to the first planar flexible substrate layer by adhesive. In some examples, the optical fibers pass through the needle onto an uncured adhesive layer on the first planar flexible substrate layer, and then the adhesive and/or an elastomeric or other fiber fixating material applied to the adhesive is allowed to cure to secure the fibers to the first planar flexible substrate layer.

The substrate 102 can be cut out into multiple shapes and/or sizes. The cutting process can be accomplished by any known cutting techniques. The fixed routing of the optical fibers can be performed in the factory. The substrate 102 including the pre-fibered layer can be made in a production facility and may be used in the field for further assembly with other elements such as the filter assemblies of a wave division multiplexing arrangement, as described in more detail below.

The fixed fiber routing scheme 100 can be pre-assembled as an integrated component as shown and then optically coupled to a plurality of optical filters or an optical filter unit as described in more detail below. The fixed fiber routing arrangement 100 can provide a relatively compact WDM arrangement with cascading filters that respects minimum bend radii by not placing optically sequential filters in the cascade in physically sequential order. In some examples, loops of excess fiber are not needed to preserve viable bend radii of the routing scheme.

The flexible substrate 102 defines a filter-side edge 104, which itself defines a plurality of filter optical connection locations provided along the edge 104. The number of filter optical connection locations corresponds to the number of optical filters to which the arrangement 100 is to be optically coupled. In this example there are five filter optical connection locations 106, 108, 110, 112, and 114, which correspond to five optical filters or optical filter assemblies to which the arrangement 100 can be optically coupled. In other examples, more or fewer optical connection locations can be provided, e.g., 2, 3, 4, 6, 7, 8, 9, 10 or more.

As depicted, the first optical connection location 106 and the second optical connection location 108 are not physically adjacent. The second optical connection location 108 and the third optical connection location 110 are not physically adjacent. The third optical connection location 110 and the fourth optical connection location 112 are not physically adjacent. In addition, a general output location 116 also positioned on the edge 104 is positioned between the fourth optical connection location 112 and the fifth optical connection location 114. The first, second, third, fourth, and fifth filter connection locations are ordered in a sequence including the first filter connection location 106, the third filter connection location 110, the fifth filter connection location 114, the fourth filter connection location 112 and the second filter connection location 108.

A general optical input location 118 is positioned on an input-side edge 120 of the substrate 102. In this example, the input-side edge 120 is opposite the filter-side edge 104. In other examples, the input-side edge can be relatively positioned to the filter-side edge 104 in any suitable manner.

The arrangement includes a first fiber 122, a second fiber 124, a third fiber 126, a fourth fiber 128, a fifth fiber 130, and a sixth fiber 132. Thus, in some examples, the number of fibers in the fiber routing arrangement is n+1, where n is a positive integer greater than 1 and corresponds to the number of filters or filter assemblies the fiber routing arrangement is to be coupled to.

Each of the first, second, third, fourth, fifth and sixth fibers 122, 124, 126, 128, 130, 132 includes a portion that is supported by the substrate 102 and at least one portion that extends from the filter-side edge 104 off the substrate 102. In addition, the first fiber 122 includes a portion that extends from the edge 120 off the substrate 102.

The arrangement 100 defines a plurality of routed fiber optic paths.

A first fiber optic path is routed on the flexible substrate 102 from the optical input location 118 to the first filter connection location 106 using the first fiber 122. A second fiber optic path is routed via the flexible substrate 102 from the first filter connection location 106 to the second filter connection location 108 using the second fiber 124. A third fiber optic path is routed via the flexible substrate 102 from the second filter connection location 108 to the third filter connection location 110 using the third fiber 126. A fourth fiber optic path is routed via the flexible substrate 102 from the third filter connection location 110 to the fourth filter connection location 112 using the fourth fiber 128. A fifth fiber optic path is routed via the flexible substrate 102 from the fourth filter connection location 112 to the fifth filter connection location 114 using the fifth fiber 130.

A sixth fiber optic path is routed using the flexible substrate from the fifth filter connection location 114 to the general output location 116. The general output location 116 is positioned between the fifth filter connection location 114 and the fourth filter connection location 112 on the edge 104. Thus, the arrangement 300 provides a series of six fiber routing paths on the flexible substrate 102 that optically connect the WDM filter assemblies in series with each other.

The example arrangement of fiber optic paths and the sequence of filter connection locations illustrated in FIGS. 3-4 can provide for a relatively compact substrate that respects minimum bend radii of the routed fibers.

The first fiber 122 serves as a general input signal fiber for the WDM arrangement and as an input signal fiber for a first optical filter assembly 160 associated with the first filter connection location 106. The second fiber 124 includes a portion 140 that serves as a reflected signal fiber for the first optical filter assembly 160 and a portion 142 that serves as an input signal fiber for a second optical filter assembly 162 associated with the second filter connection location 108. The third fiber 126 includes a portion 144 that serves as a reflected signal fiber for the second optical filter assembly 162 and a portion 146 that serves as an input signal fiber for a third optical filter assembly 164 associated with the third filter connection location 110. The fourth fiber 128 includes a portion 148 that serves as a reflected signal fiber for the third optical filter assembly 164 and a portion 150 that serves as an input signal fiber for a fourth optical filter assembly 166 associated with the fourth filter connection location 112. The fifth fiber 130 includes a portion 152 that serves as a reflected signal fiber for the fourth optical filter assembly 166 and a portion 154 that serves as an input signal fiber for a fifth optical filter assembly 168 associated with the fifth filter connection location 114. The sixth fiber 132 includes a portion 156 that serves as a reflected signal fiber for the fifth optical filter assembly 168 and a portion 158 that serves the general output signal fiber for the WDM arrangement 300.

As shown in FIGS. 3-4, the optical fibers 122, 124, 126, 128, 130 and 132 project outwardly from the flexible substrate 102 at each of the filter connection locations for splicing to the corresponding filter assembly 160, 162, 164, 166, 168 via a splice 170. In particular, the optical fiber 122 is spliced to the input signal fiber 172 of the first filter assembly 160. The portion 140 of the optical fiber 124 is spliced to the reflected signal fiber 174 of the first filter assembly 160. The portion 142 of the optical fiber 124 is spliced to the input signal fiber 176 of the second filter assembly 162. The portion 144 of the optical fiber 126 is spliced to the reflected signal fiber 178 of the second filter assembly 162. The portion 146 of the optical fiber 126 is spliced to the input signal fiber 180 of the third filter assembly 164. The portion 148 of the optical fiber 128 is spliced to the reflected signal fiber 182 of the third filter assembly 164. The portion 150 of the optical fiber 128 is spliced to the input signal fiber 184 of the fourth filter assembly 166. The portion 152 of the optical fiber 130 is spliced to the reflected signal fiber 186 of the fourth filter assembly 166. The portion 154 of the optical fiber 130 is spliced to the input signal fiber 188 of the fifth filter assembly 168. The portion 156 of the optical fiber 132 is spliced to the output reflected signal fiber 190 of the fifth filter assembly 168.

In at least some examples, one or more of the portions of the fibers extending beyond the edge 104 of the substrate 102 and having portions fixed by the substrate 102 are long enough to be brought to a splice machine, such as a fusion splice machine. In some examples, the splicing can be performed such that splices 170 float freely when an overlength of fiber is folded back on top of the substrate, as will be described in more detail below. In some examples, the splices 170 are over-molded with a coating (e.g., a 250 micrometer thick coating) as a protection for the splice.

The wavelength transmitted through and not reflected by the first filter assembly 160 travels along the output fiber 192. The wavelength transmitted through and not reflected by the second filter assembly 162 travels along the output fiber 194. The wavelength transmitted through and not reflected by the third filter assembly 164 travels along the output fiber 196. The wavelength transmitted through and not reflected by the fourth filter assembly 166 travels along the output fiber 198. The wavelength transmitted through not and reflected by the fifth filter assembly 168 travels along the output fiber 200.

The general output fiber 158 carries signals that are downstream of the filter assemblies, while the general input fiber 122 carries signals that are upstream (e.g., optically upstream along the propagation route of the optical signals) of the filter assemblies.

Referring to FIG. 4, optionally, the substrate 102 includes a fibered portion 202 and a fiber management portion 204. Optionally, the fiber management portion 204 is foldable over or under the fibered portion 202, e.g. about a fold line 206. The fiber management portion 204 can include fiber management structures, such as tabs, cutouts, fingers, lips, etc., for holding overlengths (e.g., loops, partial loops) of optical fiber. In some examples, the fiber management portion defines a pocket or a sleeve that can receive fiber overlength or portions of fiber overlength. In this example, the fiber management portion 204 includes slots 208 and fingers 210 that cooperate to support overlengths of fiber such as the loops 212 schematically shown. Such overlengths can be desirable or required to perform proper splicing at the splices 170 without bending the fibers beyond their minimum bend radii. The fiber management portion 204 supports the loops, and can then be folded over the fibered portion 202 to form a compact WDM arrangement 300. In addition, in some examples the fiber management portion 204 can include one or more structures that store the splices 170.

Figure 5:
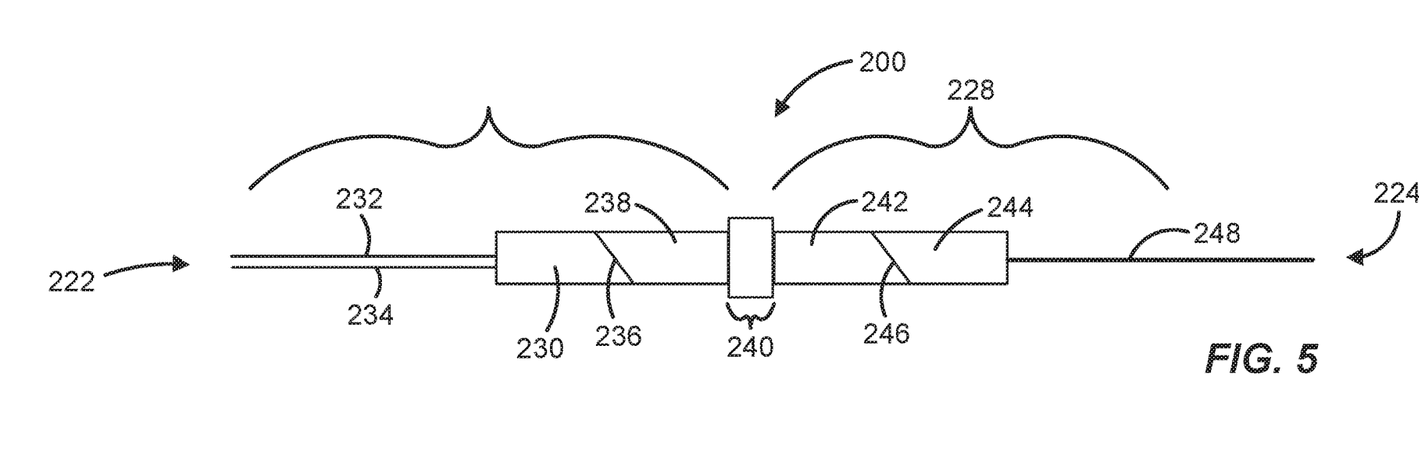
FIG. 5 is a schematic view of an example WDM filter assembly assembled in accordance with aspects of the present disclosure.

FIG. 5 is a schematic view of an example WDM filter assembly 220 assembled in accordance with aspects of the present disclosure. In some example, the filter assembly 220 corresponds to any of the filter assemblies 160, 162, 164, 166, 168 of FIG. 4.

The filter assembly 220 defines an input side 222 and an output side 224, and signal input arrangement 226 and a signal output arrangement 228. The signal input arrangement includes a ferrule 230 (e.g., a ceramic or metal ferrule) that terminates an input signal fiber stub 232 and a reflected signal fiber stub 234. The stubs can be spliced to fibers of the substrate supported fixed fiber arrangement as described above. The ferrule 230 has been pre-processed to include an angled front face 236 (positioned at an oblique angle to the fiber axes) that engages a complimentarily angled surface of a grin lens 238 such that the stubs 232 and 234 are terminated directly to the grin lens 238 and such that the ferrule 230 and the grin lens 238 are connected to each other at an angled interface.

The grin lens 238 functions to expand the input signal provided to the layered WDM filter arrangement 240 downstream (e.g., optically downstream along the propagation route of the optical signals) of the grin lens 238 via the fiber stub 232, and also collimate the signal reflected back from the WDM filter arrangement 240 to the reflected fiber stub 238.

The signal output arrangement 228 includes a grin lens 242 connected at an angled interface 246 to a ferrule 244 that terminates an output fiber 248 configured to carry the wavelength that passes through the filter. The grin lens 242 functions to collimate the signal that passes through the WDM filter arrangement 240 to the output fiber 248.

In a non-limiting example preparation of the filter assembly 220, a curable adhesive (e.g. an ultraviolet (UV) curable adhesive) is used to glue each grin lens 238, 242 to its corresponding ferrule 230, 244 at the corresponding angled interface. Each of the signal input arrangement 226 and signal output arrangement 228 is then attached to opposite sides of the multilayered filter arrangement 240, e.g., using a curable adhesive, e.g., a UV curable adhesive.

In a further non-limiting example preparation, the fibers 232, 234, and 248 are spliced (e.g., laser spliced with a $CO_2$ laser) directly to corresponding grin lenses 238, 242 and the input and output assemblies are then attached to opposite sides of the multilayered filter arrangement 240. In some of these examples, the fibers are not first terminated at ferrules.

Figure 6:
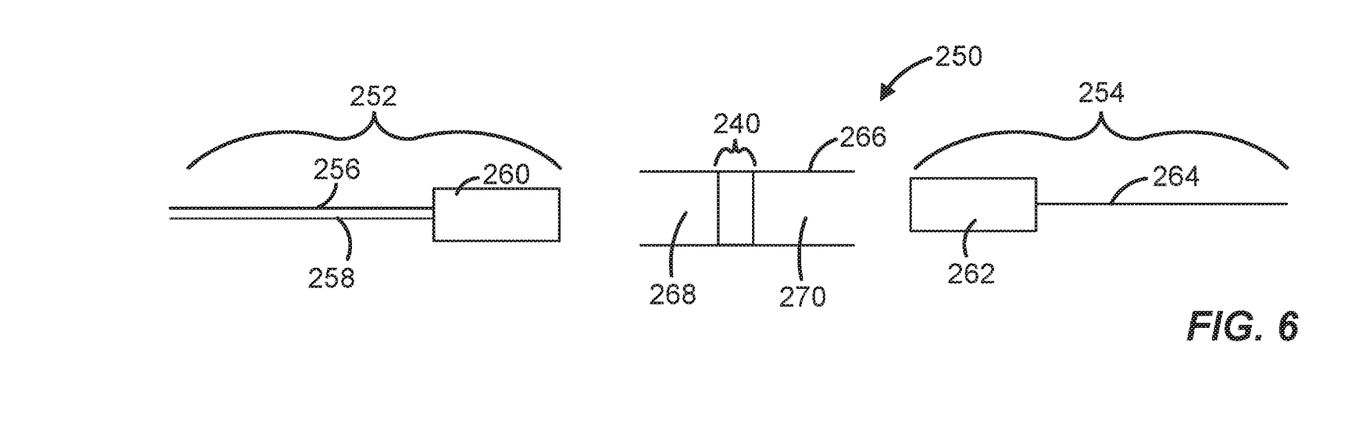
FIG. 6 is a schematic view of an example partially assembled WDM filter assembly that can be assembled in accordance with further aspects of the present disclosure.

A further non-limiting example preparation of a filter assembly 250 is illustrated in FIG. 6. In this example, a signal input arrangement 252 is prepared by laser splicing an input signal fiber 256 and a reflected signal fiber 258 to a grin lens 260, and a signal output arrangement 254 is prepared by laser splicing an output signal fiber 264 to a grin lens 262. A multi-layered filter arrangement 240 is positioned in a filter receptacle 266 that includes an input side cavity 268 and an output side cavity 270. The grin lens 260 is inserted in the cavity 268 and adhered (e.g., with UV curable adhesive) to the filter arrangement 240, and the grin lens 262 is inserted in the cavity 270 and adhered (e.g., with UV curable adhesive) to the opposite side of the filter arrangement 240.

Figure 7:
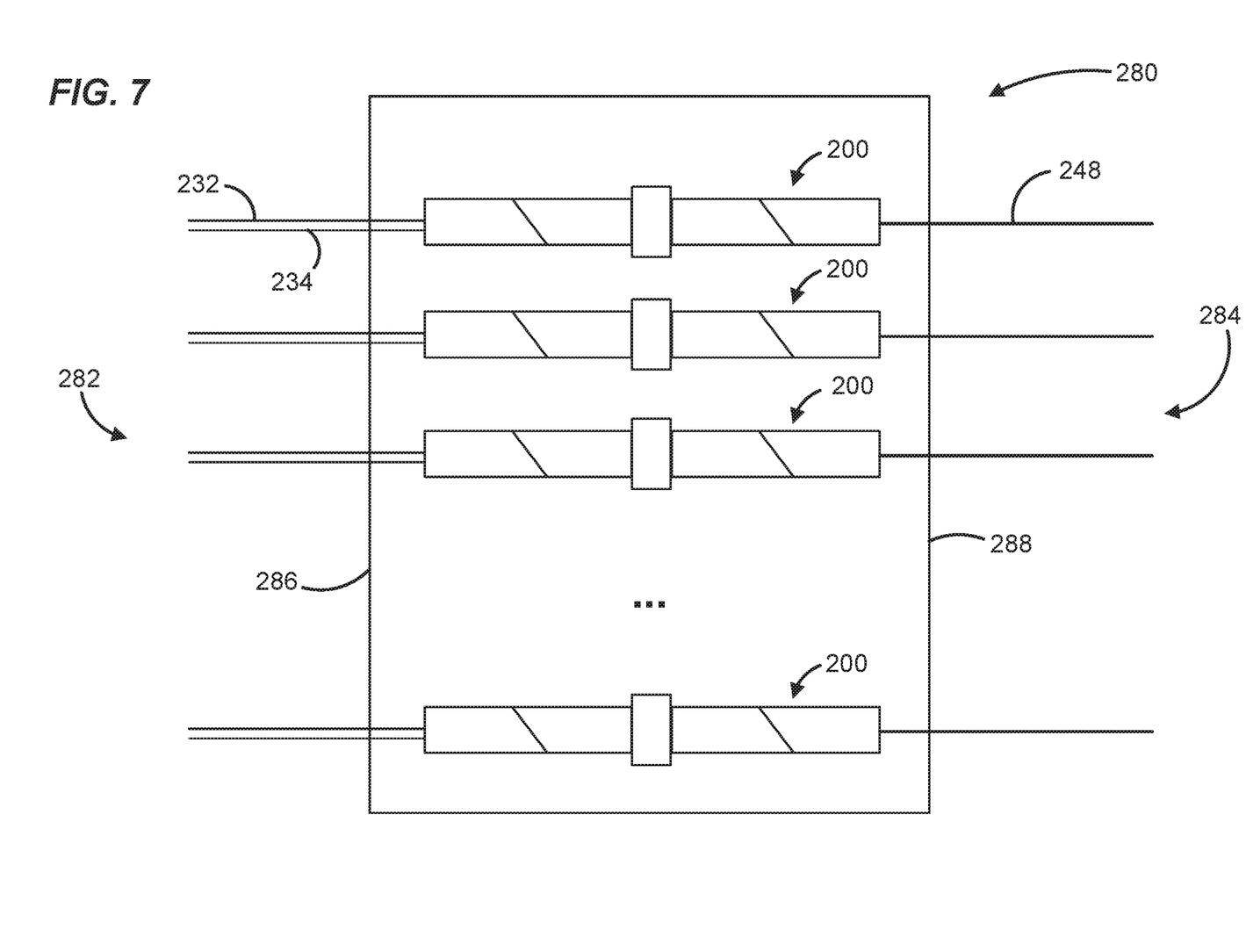
FIG. 7 is a schematic view of an example pre-assembled WDM filter unit or package in accordance with the present disclosure that can be spliced to a fixed fiber routing scheme of the present disclosure.

FIG. 7 is a schematic view of an example pre-assembled WDM filter package or device 280 in accordance with the present disclosure that can be spliced to a fixed fiber routing scheme of the present disclosure, such as the fiber routing scheme of FIG. 3. The package 280 includes any desired number of the WDM filter assemblies 200, or any other suitable filter assemblies that can be serialized to perform wave division multiplexing. The packaging 280 can include any suitable housing or other structure to secure and fix the WDM filter 200 in the desired array. The array of filters 200 can, e.g., correspond to an array defined by the sets of first and second optical fibers of the fiber connection locations of FIG. 3, or any other array of fiber connection locations at the edge of a substrate that fixes a fiber routing arrangement.

Each of the WDM filters 200 includes an input signal optical fiber 232 that projects away from the packaging arrangement 280 at an input side 282 of the packaging arrangement 280 and extending from a first side 286 of the packaging arrangement 280, a reflected signal optical fiber 234 that projects from the packaging arrangement at an input side 282 of the packaging arrangement 280 and extending from the first side 286 of the packaging arrangement 280, and a pass-through signal optical fiber 248 that projects from the packaging arrangement 280 at an output side 284 of the packaging arrangement 280 and extending from a second side 288 of the packaging arrangement 280 that is opposite the first side 286.

From the forgoing detailed description, it will be evident that modifications and variations can be made without departing from the spirit and scope of the disclosure.

What is claimed is:

1. A fiber routing arrangement, comprising:
   a flexible substrate;
   a plurality of filter optical connection locations provided along an edge of the flexible substrate, the filter optical connection locations each including a set of first and second optical fibers, each set of first and second optical fibers being coupled to a separate WDM filter; and
   fiber routing paths on the flexible substrate that optically connect the WDM filters in series with each other, each of the fiber routing paths extending in a first direction from one of the filter optical connection locations to another of the fiber optical connection locations in a second direction, the first direction being opposite the second direction,
   wherein at least one of the first and second optical fibers of the sets includes a bend on the flexible substrate such that two portions of the at least one of the first and second optical fibers both extend in the same direction from the edge of the flexible substrate to locations off of the flexible substrate and are spliced off the flexible substrate to fibers connected to two of the WDM filters; and
   wherein none of the fiber routing paths extends between two of the plurality of filter optical connection locations that are physically adjacent to each other.

2. The fiber routing arrangement of claim 1, wherein the fiber routing arrangement further includes a signal input location for inputting a signal to the fiber routing paths upstream of the WDM filters and a signal output location for outputting a signal from the fiber routing paths downstream from the WDM filters.

3. The fiber routing arrangement of claim 1, wherein overlength of a least one of the first and second optical fibers of the sets is stored at a folded portion of the flexible substrate.

4. The fiber routing arrangement of claim 1, wherein the first and second optical fibers of each set are respectively spliced to a WDM input optical fiber that provides an input to the WDM filter and a WDM reflected signal fiber that carries a signal reflected back from the WDM filter.

5. The fiber routing arrangement of claim 1, wherein the first and second optical fibers of each set are each terminated directly to a grin lens.

6. The fiber routing arrangement of claim 5, wherein each grin lens expands an input provided to the WDM filter and the grin lens collimates a signal reflected back from the WDM filter.

7. The fiber routing arrangement of claim 6, wherein each grin lens is a first grin lens, wherein a first ferrule is connected to each first grin lens at an angled interface, wherein a layered WDM filter arrangement is connected between each first ferrule and a second ferrule, and wherein each second ferrule is connected at an angled interface to a second grin lens for collimating a signal that passes through the WDM filter arrangement.

8. The fiber routing arrangement of claim 1, wherein the WDM filters are packaged within one packaging arrangement having optical fibers arranged in an array that corresponds to an array defined by the sets of first and second optical fibers of the fiber connection locations.

9. The fiber routing arrangement of claim 1, wherein all of the sets of first and second optical fibers extend past the edge and off of the flexible substrate and are spliced off the flexible substrate to fibers connected to the WDM filters.

10. The fiber routing arrangement of claim 1, wherein another of the first and second optical fibers of the sets extends from the edge in the same direction as the two portions of the one of the first and second optical fibers to another point off of the flexible substrate and is spliced off the flexible substrate to a fiber connected to a third of the WDM filters that is positioned between the two WDM filters.

* * * * *